United States Patent [19]

Green

[11] Patent Number: 5,750,049

[45] Date of Patent: May 12, 1998

[54] CHIRAL OPTICAL POLYMER BASED INFORMATION STORAGE MATERIAL

[75] Inventor: Mark M. Green, New York, N.Y.

[73] Assignee: Hayes Soloway, Hennessey, Grossman & Hage, Manchester, N.H.

[21] Appl. No.: 587,234

[22] Filed: Jan. 16, 1996

[51] Int. Cl.$^6$ ............................. G09K 19/52; G07F 1/13
[52] U.S. Cl. ..................... 252/299.01; 349/183; 430/20
[58] Field of Search ..................... 252/299.01; 430/19, 430/20; 349/183, 184

[56] References Cited

U.S. PATENT DOCUMENTS

| | | | |
|---|---|---|---|
| 3,810,860 | 5/1974 | Doyle | 260/33.6 |
| 5,132,355 | 7/1992 | Nahlovsky | 524/474 |
| 5,384,221 | 1/1995 | Savant et al. | 430/19 |
| 5,459,192 | 10/1995 | Green et al. | 524/474 |
| 5,480,749 | 1/1996 | Green | 430/19 |

OTHER PUBLICATIONS

Green et al; "Macromolecular Stereochemistry: The Out--Of-Proportion Influence of Optically Active Comonomers on the Conformational Characteristics of Polysocyanates. The Sergeants and Soldiers Experiment"; 1989; pp. 6452–6454; American Chemical Society.

Khatri et al; "Optical Activity and the Thermally Reversible Gelation of Poly(n-hexyl isocyanate) in Hydrocarbon Solvents: Aggregates and the Bad Neighbor Theory"; Aug. 1992, vol. 33, No. 2; pp. 359–360; American Chemical Society.

Green et al; "Dilute-Solution Chiral Optical Changes Signal the Thermally Reversible Gelation of Poly(n-hexyl isocyanate) in Hydrocarbon Solvents"; 1993; pp. 1–3; American Chemical Society.

Maxein et al; "Photochemical Inversion of the Helical Twist Sense in Chiral Polyisocyanates"; 1995; pp. 8438–8440; Macromolecules vol. 28, No. 24.

Yashima et al; "Photocontrolled Chiral Recognition by [4-(Phenylazo)phenyl]carbamoylated Cellulose and Amylose Membranes"; 1995; pp. 8368–8374; Macromolecules vol. 28, No. 24.

Muller et al; "Interplay of Chiral Side Chains and Helical Main Chains in Polyisocyanates"; 1996; pp. 1609–1617; Macromolecules vol. 29, No. 5.

Kim et al; "Polarized Laser Induced Holographic Surface Relief Gratings on Polymer Films"; 1995; pp. 8835–8839;Macromolecules vol. 28, No. 26.

Feringa et al; "Chiroptical Switching between Liquid Crystalline Phases"; 1995, pp. 9929–9930; vol. 117, No. 39 Journal Americal Chemical Soc.

Willner et al; "Control of the Structure and Functions of Biomaterials by Light"; 1996; pp. 367–385; Angew. Chem. Int. Ed. Engl. vol. 35.

Itagaki et al; "Helix–Coil Transition and Physical Gelation of Isotactic Polystyrene in cis–and trans–Decalin Monitored by Fluorescence Measurements"; 1995; pp. 5477–5486; Macromolecules vol. 28, No. 16.

Brown et al; "Azo Polymers for Reversible Optical Storage. 5. Orientation and Dipolar Interactions of Azobenzene Side Groups in Copolymers and Blends Containing Methyl Methacrylate Structural Units";1995;pp. 6116–6123; Macromolecules vol. 28, No. 18.

Natansohn et al; "Azo Polymers for Reversible Optical Storage. 6. Poly |4-[2-(methacryloyloxy) ethyl]azobenzene]"; 1995; pp. 4179–4183; Macromolecules vol. 28, No. 12.

Ho etal; "Azo Polymers for Reversible Optical Storage. 9. Copolymers Containing Two Types of Azobenzene Side Groups"; 1996; pp. 44–49; Macromolecules vol. 29, No. 1.

*Primary Examiner*—Shean C. Wu
*Attorney, Agent, or Firm*—Hayes, Soloway, Hennessey, Grossman & Hage, P.C.

[57] ABSTRACT

An optical information storage material which can reversibly store said information comprising a polymeric material with a dependence of optical activity on temperature characterized in that the optical activity is substantially invariant at temperatures below Tg of said polymer, and variant at a temperatures at or near or above the Tg.

8 Claims, 3 Drawing Sheets

CHIRAL OPTICAL POLYMER BASED INFORMATION STORAGE MATERIAL

FIELD OF THE INVENTION

The present invention relates to the preparation of of a new type of information and storage material based upon the chiral optical effects in an amorphous polymer matrix.

PRIOR ART

As one part of a program supported over several years by the National Science Foundation and the Petroleum Research Fund, I have investigated the possibility of forming molecular composites of polyisocyanates with random coil polymers. Such materials have been suggested as ideal for mechanical reinforcement because of the rigid character of the polyisocyanates. See, Eisenbach, C. D.; Hoffman, J; Fischer, K. *Macromol Rapid Commun.* 1994, 15, 117. In addition, attention is directed to U.S. Pat. No. 5,459,192, and references cited therein, where I disclosed thermally reversible gels comprising liquid solvents wherein the solvent was converted into a thermally reversible gel upon the addition of a rigid polymer, preferably, a liquid crystal forming polymer.

In two attempts at forming such blends reported in the literature only kinetic trapping was possible with phase separation evident, and therefore I undertook synthetic work to incorporate hydrogen bonding groups in the side chains to enhance the attractive interactions between the polyisocyanate and the coil matrix. This was successful with three different polyisocyanates incorporating ether, ester and ketone side chain functions and led to a series of materials with interesting potential for further study of mechanical properties, glass transitions and phase boundaries. See Khatri, C. A.; Vaidya, M. M.; Levon, K.; Green, M. M., Macromolecules, 1995, 28, 4719.

The molecular composites formed from the side chain adapted polyisocyanates with a copolymer of styrene and vinyl phenol showed the expected dependence of the glass transition temperature, Tg, on the composition of the blend. Optical microscopy experiments supported the absence of phase separation while infrared studies demonstrated the expected hydrogen bonding interactions. One of these examples with an ester side chain, benzyl butyrate isocyanate (poly-BBI) exhibiting the effect of composition on the glass transition temperature.

In the microscopy work on the blends there was no evidence of birefringence, consistent with the thermodynamic mixing, but also emphasizing the fact that these are solid solutions with isotropic properties. This fact allows the possibility, as in all isotropic liquid solutions, of observing molecular optical activity properties.

The polyisocyanates form a stiff helical conformation. In long chains stereoblocks of left and right handed helices are separated by rarely occurring helix reversals which form a kink or bend in the chain. The helix reversals are rapidly mobile in solution allowing interconversion of the equally probable mirror image helical stereoblocks. These polymers which are therefore optically inactive may be converted to highly optically active polymers by incorporating structural elements which favor one or the other helical sense.

Accordingly, the chiral optical properties of these isocyanates are strongly dependent on the conformation or shape of the polymer. This is generally true for optically active polymers, i.e., non-racemic chiral polymers, as has been known since the some early work on optically active stereoregular polymers and continues to be presently observed. Since conformation must always depend on temperature, this means that the chiral optical properties of polymers also strongly depend on temperature. In solution, this dependence is reversible but the character of polymers to form solid solutions (blends) and amorphous states with glass and rubber properties offers an opportunity to control the optical activity properties in a way not possible with liquid solutions. In the glassy state conformational changes are severely restricted and therefore optical activity cannot change. Above the glass transition conformational motions are allowed and one can expect behavior parallel to that in liquid solutions where chiral optical properties are diminished as a continuous function of temperature, the temperature increase causing increasing populations of compensating conformations.

With the above in mind, a discussion of optical storage systems is now in order. Optical data storage can be divided into two types: optical disk and holographic. In the former, bits of information are read written onto circular tracks of a rotating disk using a focused laser been. The disk substrate consists of a material whose optical properties can be altered when illuminated by light from an intense writing beam: a weaker read beam then probes the state of the medium. In current technology, the write beam ablates, melts or photochemically alters the medium, and the read beam detects changes in the reflectivity of the substrate.

In digital holographic storage, a string of its is store as an image consisting of a two dimensional array of light and dark squares, using a spatial light modulator. A hologram of this image is recorded as an interference pattern in a photorefractive crystal such as $LiNbOg_4$. Spatial and rotational multiplexing allow high storage densities. Illuminating the crystal with a reference beam allows the reconstruction of the image, which is then read out with a COD array. A practice multiple-page system based on this technology ha recently been demonstrated.

In both technologies there is the need for better materials whose optical properties are temporarily or permanently altered by a writing beam. Existing photorefractive crystals are expensive and difficult to grow with reproducible optical properties. Some effort has gone into the development of photorefractive polymers based on doped, photoconducting polymers such as poly(N-vinylcarbazole). These generally require the application of an external poling electric field in order to operate.

It is therefore a primary object of this invention is to create a new type of information storage material based on chiral optical effects in an amorphous polymer matrix.

More particularly, it is an object of ibis invention to provide an amorphous solid sample of a chiral no-racemic polymer where the optical activity depends on polymer conformation or shape and heat to a selected temperature above the Tg, wherein the optical activity achieved above Tg will reflect said selected temperature, followed by quenching, wherein the optical activity will be stored in a state where it cannot change.

It is then still a further object of this invention to heat the amorphous polymer with said store optical activity to a temperature near the Tg, whereupon the optical activity will lose its memory of the former heating and change to a value consistent with the Tg, wherein the material will then be available to be heated again to store new information.

Furthermore, it is an object of this invention to use, as a heating unit a pixel which gains energy using, for example, laser diodes and dyes, wherein an information storage system is developed in which information is available in an analog manner that is continuously tracking the energy input and is not "zero-one" but rather any pixel can assume a large number of states (optical activity) as in a holographic system.

Finally, it as a more specific object of this invention to use, as the vehicle for the information storage system described above, a polyisocyanate polymer. Although other polymers whose optical activity depends upon conformation are contemplated, including even polymer which contain a side-chain an optically active group which can racemize (lose its optical activity) when undergoing a conformational motion which is not possible below Tg.

SUMMARY OF THE INVENTION

An optical information storage material which can reversibly store said information comprising a polymeric material with a dependence of optical activity on temperature characterized in that the optical activity is substantially invariant at temperatures below Tg of said polymer, and variant at a temperatures at or near the Tg.

In process form, a method for reversibly storing optical information is disclosed, comprising supplying a polymeric material with a dependence of optical activity on temperature characterized in that the optical activity is substantially invariant at temperatures below Tg of said polymer, and variant at a temperatures at or near the Tg, exposing said material to light wherein the absorption of light induces a temperature change in the polymer and develops in said polymer a preselected optical activity, followed by quenching below Tg wherein the preselected optical activity comes stored.

Moreover, the present invention comprises th blending of polymers to form a solid solution of optically active polymers in a amorphous matrix, wherein one of the blend components is chiral and non-racemic or optically active is functionalized to provide a means for visibility in the value of Tg, further characterized in that said chiral and non-racemic or optically active component and it's blend partner polymer are selected according to structure and/or composition to control the transition temperature necessary for writing, reading, and erasing optical information.

BRIEF DESCRIPTION OF THE DRAWINGS

FIG. 1A illustrates the Differential Scanning Calorimetry (DSC) of polyisocyanate blends, wherein

DETAILED DESCRIPTION OF THE PREFERRED EMBODIMENTS

An optical information storage material which can reversibly store said information comprising a polymeric material with a dependence of optical activity on temperature characterized in that the optical activity is substantially invariant at temperatures below Tg of said polymer, and variant at a temperatures at or near the Tg.

Preferably, the polymer material an amorphous solid sample of a polymer, which can be the optically active polymer itself or a blend. In the latter case, the Tg can be varied by choice of structure and composition. In the former case Tg can be varied using additives. The optical activity is dependent upon the conformation or shape of the polymer, and the conformation or shape is itself dependent upon temperature. In this manner it can be appreciated that when the heating unit is a pixel which gains energy using laser diodes and dyes an information storage system is developed in which the information is available in analog manner that is, not "zero-one" but rather any pixel can assume a large number of states (optical activities) as in a holographic system.

The reading of such stored optical information is therefore not limited to a single wavelength as for a chromophore since it is the nature of the optical rotatory dispersion that the optical activity can be readily detected far from the chromophore, that is, well into the visible region or whatever wavelength is convenient.

Moreover, it can be appreciated that in the case of the preferred amorphous polymers, the Tg becomes the critical juncture for writing (storing) and erasing of the optical activity or optical information. In addition, recognizing that Tg can be altered by among other items, structural features in the polymers, such as either main-chain or side chain rigidity, and/or blending with another polymer component or by the case of additives, the Tg can be altered to a desired temperature range which, as noted, serves as the juncture for recording and easing of optical information. Therefore, it can be appreciated that the herein disclosed information storage system has tremendous versatility in providing the user the opportunity to select a desired temperature range for an optical storage procedure.

A particularly preferred polymer material for the above referenced optical storage system includes those resins or polymers known generally as polyisocyanates, which serve as an excellent example of a polymer with a strong dependence of optical activity on temperature.

Figure 1A:
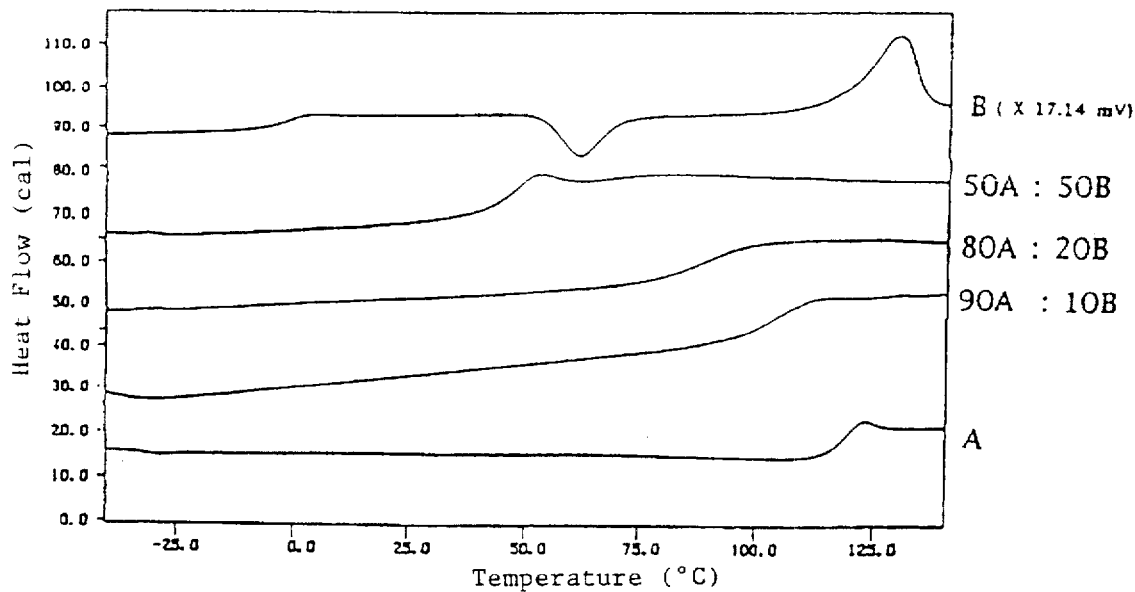
Figure 1B:
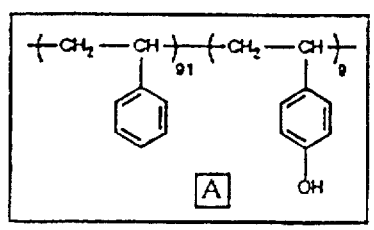
FIGS. 1B and 1C represent the structures of the polymer components, A and B, of the blend.
Figure 1C:
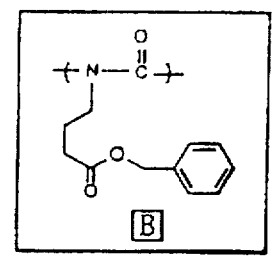

In the case of a polyisocyanate, specifically a copolymer of 3-benzyloxycarbonyl-n-propyl isocyanate (FIG. 1C) and (R)-2,6-dimethylheptylisocyanate, said material was heated followed by cooling (FIG. 1A) to below its Tg, wherein a record of heating was seen to have been stored in the polymer as a change in optical activity (which depended upon the highest temperature reached).

More specifically, a random copolymer of one of the hydrogen bond accepting side chain isocyanates (BBI) was prepared with an optically active isocyanate in such proportions that the copolyisocyanate (co-poly BBI) formed consisted of stereoblocks of the left and right handed helices in unequal amounts. The copolymer produced (co-poly BBI) was therefore optically active, showed a strong temperature dependence of this optical activity in solution in toluene, and formed a compatible blend with the copolymer of styrene and vinyl phenol (PHS-9) (FIG. 1B) used in molecular composite studies of the analogous optically inactive polyisocyanates. In control experiments, thin films were cast from solutions of the optically inactive polyisocyanate (poly-BBI) molecular composites with PHS-9 which were shown to give rise to no optical activity in polarimetric measurements at various wavelengths.

Figure 2A:
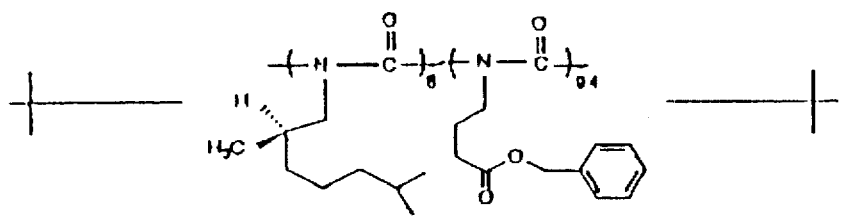
FIGS. 2A and 2B illustrates a comparison of temperature dependent optical activities.
Figure 2A:
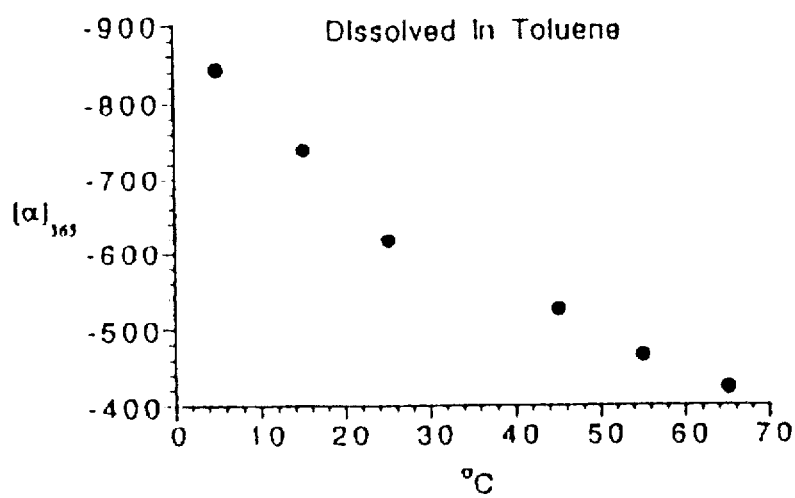
Figure 2B:
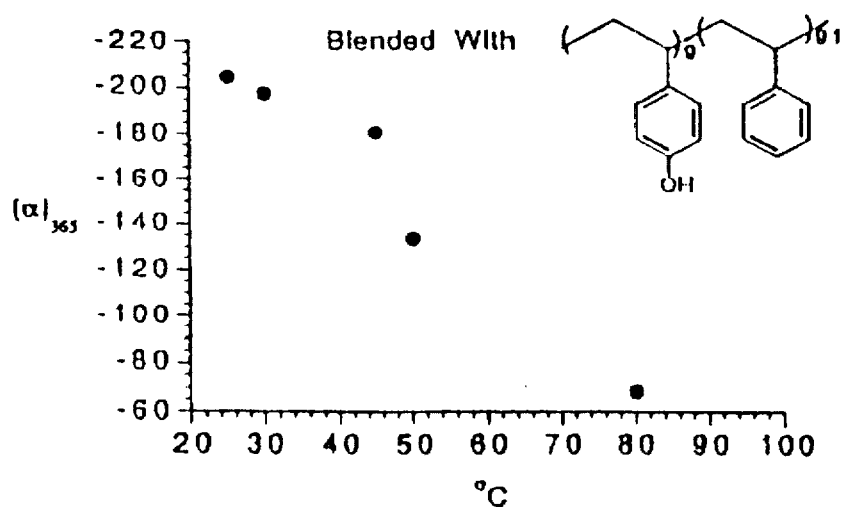
Figure 3:
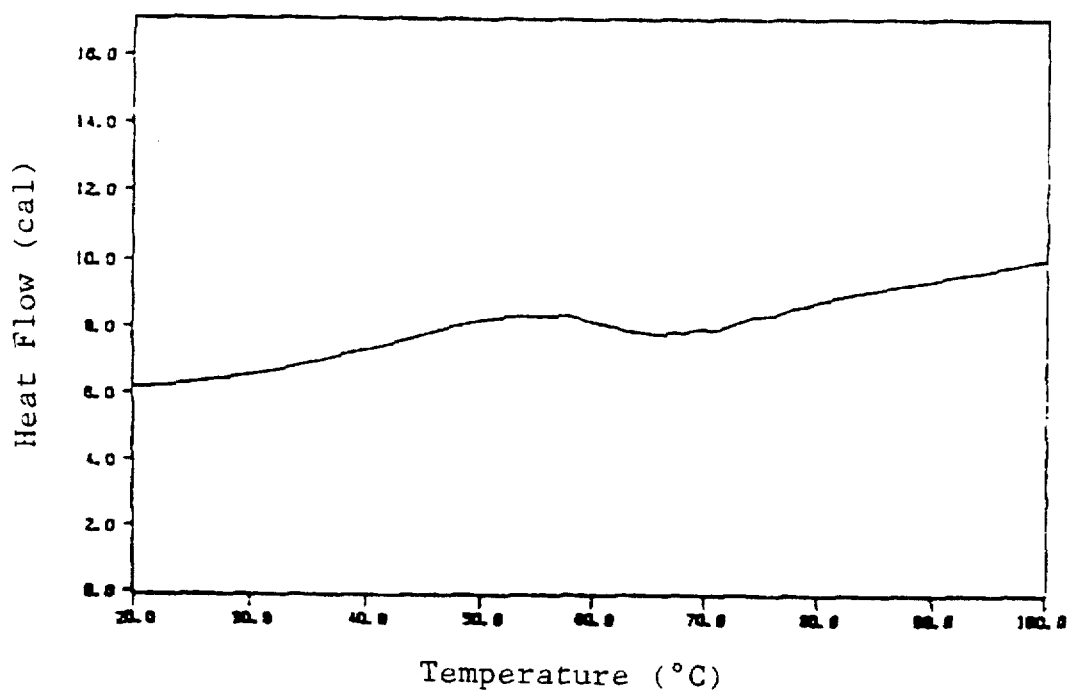
FIG. 3 shows the DSC of the blend responsible for the optical activity in FIG. 2B.

The strong temperature dependence in solution in toluene shown in FIG. 2A is typical of the optically active copolymers and consistent with the change in population and therefore necessary movement of the helix reversals with changing temperature. The optical activity properties in the blend (FIG. 2B) assume a different temperature dependence compared to the dilute solution with a large change in optical activity with temperature occurring only above about 45 to 50 degrees C. FIG. 3 shows the differential scanning calorimetry of the blend responsible for the optical activity data in FIG. 2B. There is a clear discontinuity in the DSC scan( FIG. 3) pointing to the glass transition close to the temperature range associated with the onset of change in optical activity seen in FIG. 2B. This optical rotation of the blend has been measured several times at various wavelengths for variously prepared films with similar results. The blends are formed for these measurements by solvent evaporation at about 20 degrees C. with solution concentration and film size adjusted to form a film of about 0.1 mm. Under these conditions, going from the glassy to the rubbery state at near to 50 degrees C. would suddenly allow the helix reversal population to increase thereby reducing the optical activity. The optical activities attained by increasing temperature remain fixed on the time scale necessary for cooling by ambient means to below the glass transition and subsequent measurements are permanent at temperature below the Tg. In this way they remain a record of the highest temperature attained.

The information storage material herein described offers considerable flexibility in the choice of reading and writing wavelengths. The incident writing wavelength can he chosen to match the absorption band of the optically active chromophore at 255 nm. Alternatively, a low molecular weight dye can be added to the polymer blend to provide absorption at any convenient wavelength.

In the case of existing optical technology which is based on near-infrared and red diode lasers and diode laser arrays, a polymer film would be preferred containing near-infrared absorbing dyes. Additionally, although readout sensitivity is maximized at wavelengths approaching the 255 nm absorption band, the nature of the long wavelength tail allows detection in the visible region of the spectrum.

Those skilled in the art will appreciate that the herein disclosed information storage system based on the the preferred polyisocyanate composites is the greatly controlled variability in the structure of both the side chain of the polyisocyanates and also in the random coil blending component. For example, other hydrogen bond donor matrix polymers such as UV transparent copolymers of methacrylic acid and esters of methacrylic acid can act to blend with the polyisocyanate (co-polyBBI). This gives control over both the wavelength transparency of the material and the glass transition temperature.

In addition, transparency over a wide wavelength range means that one can ignore the optical properties of the matrix in both the writing and reading optical processes. Accordingly, there are no restrictions on the wavelengths.

It is also preferred to have control over the glass transition temperature in order to insure that the stored optical information will not be degraded during storage over long periods of time at desirable use temperatures. In addition, Tg must be low enough so that information can be written with accessible light intensities sufficient to produce the desired temperature rise.

One method of controlling Tg in involves copolymerization of various esters of methacrylates and also acrylates with their respective free carboxylic acids. The ratios of the components and the nature of the alkyl ester groups both act as control features in the storage system described herein.

These vinyl based polymers are preferred for the herein disclosed optical storage system since they satisfy the need to control the glass transition and are transparent to light over a wide wavelength range and the carboxylic acid groups present in these materials are hydrogen bond donors. Therefore compatible blends with the hydrogen bond accepting side chain polyisocyanates will be conveniently produced.

Other preferred copolymers include a polyisocyanate with an oxyethylene side chain which forms a stiff polyisocyanate because of the three methylene groups intervening between the first oxygen and the side chain. This stiffness is seen in the optical activity properties of a copolymer with this monomer and (R)-2,6-dimethylheptylisocyanate. This is water soluble and forms a strong adhesive to a wide variety of substances. The presence of several methylene spacers between the backbone and the oxyethylene groups maintain the stiff helical character which is otherwise lost in this system. This particular polyisocyanate therein provides compatible blends with hydrogen bond donor random coil matrices.

In addition a polyisocyanate has been prepared with carboxylic acid groups in the side chain. This was prepared by hydrogenolysis of poly(BBI) discussed above. This polyisocyanate is widely soluble in hydrogen bond accepting solvents, and therein provides compatible blends with those poly(oxyethylene) compositions and related hydrogen bond accepting materials which are UV transparent.

Accordingly, in the context of the present invention, blending, making use of hydrogen bonding interactions which enhance compatibility, the combined features of polymer compatibility, control of Tg, and wavelength transparency are accessible.

It is worth noting that to best control the system described herein, the optical activities be measured as a function of both concentration of the preferred polyisocyanate in the blend, and film thickness. UV transparency gives these options since the wavelength can be adjusted to compensate for the smaller observed optical activities associated with thin films or low concentrations.

UTILITY

In regards to the utility of the optical storage system described herein, in the case of an optical disc technology based on transmission, writing can take place by either absorbing light directly into the polyisocyanate chromophore or by using diode lasers. For the former purpose the fourth harmonic of a mode-locked Nd:YAG laser is preferred which emits light at 266 nm which is well within the absorption band centered at 255 nm. For diode laser work, low molecular weight dyes must be added to the blends to provide the appropriate optical absorption at the writing wavelength. This may affect the glass transition and other thermal properties.

As previously noted, the invention described herein is not limited to the polyisocyanates but can be extended to any polymer with strong dependence of optical activity on temperature caused by conformational effects. As a further working example, thin films of optically active copolymers synthesized from styrene derivatives and carbon monoxide have been prepared (see M .Brookhart and M. I. Wagner, G. A. Balavoine, H. A. Haddou, J. Amer. Chem. Soc., 1994, 116, 3641) and reproduced in the solid amorphous state, the chiral optical properties found in solution. The glass transition temperatures are near to 150 degrees C as determined by DSC measurements. Moreover, the carbonyl groups which alternate in the backbone of these copolymers form hydrogen bonds and therefore one can vary the glass transition temperature by varying the blend components and their composition. This parallels to the preferred polyisocyanate polymer systems.

In addition, other preferred polymers exist with chiral optical properties which depend on backbone conformation such as the polyacetylenes and polysilanes and appropriate functionalization with polar groups which can be accomplished in the side chains and therefore glass transition temperature control.

In the inventive system described herein the material can store the information reversibly since the optical activity memory can be erased by annealing at or near the glass transition temperature and the written on again by exposure to temperatures above that point and stored again by quenching to well below the glass transition temperature, the latter controllable by the use of appropriate blending as noted above in the polyisocyanate example.

In the case of an irreversible system, an optically active group is that which again can racemize by a conformational motion. However, when the optically active group is part of a polymer amorphous matrix well below the glass transition the raceinization will not be possible. Energy input though can allow the racemization to proceed a process which can be stopped by quenching to below the glass transition temperature. By way of example of this embodiment, a copolymer of the binaphthyl ester of methacrylic acid with a large molar excess (200–1) of methacrylic acid was synthesized by a free radical copolymerization of these monomers which because of their preparation will be a random copolymer. This water soluble copolymer interacts with a cyclodextrin at basic pH causing a complex between the cyclodextrin and the pendant binaphthyl group which leads to a partial resolution of the two enantiomers of the binaphthyl. These mirror forms are atropisomeric and interconvert slowly at room temperature by conformational motion around the connecting 1, 1' bond between the two naphthalene rings when the cyclodextrin is removed. The latter is accomplished by lowering the pH to below about 4.5 or by precipitation and working with organic solvents. This material was converted with diazornethane to poly (methylmethacrylate) labeled with one part in 200 of the binaphthyl pendant group in optically active form. Spin casting of this material from solution at room temperature produced the optically active film which similar to the material known as "Plexiglas" except for the label. Since the glass transition temperature of this material is at or near to 110 degrees C., racemization will be impossible over a wide range of temperatures below this point but becomes possible by heating a pixel above this point with the use of lasers and dyes. The temperature reached and the time of heating then will control the extent of racemization.

As described herein, the present invention does not simply describe the use of the glass transition as a distinguishing point for the writing and storing of information, but rather the combination of the effects of conformation of chiral polymers on their chiral optical properties and the trapping and releasing of conformational motion using the transition between the glassy and rubbery states, in combination with the use of blending to control the temperature of the transition. This is unique in the art in the area of information technology and forms one basis of the invention herein as demonstrated in the example of the blending of the polyisocyanates above where the intrinsic glass transition of the polyisocyanates are too low in temperature to be useful to control the conformational properties but can be adjusted by blending.

Those skilled in the art will recognize or be able to recognize, by no more than routine experimentation, many equivalents of the specific embodiments described herein.

Such equivalents are intended to be encompassed by the following claims.

What is claimed is:

1. An optical information storage material which can reversibly store said information comprising a chiral polymeric material with a dependence of optical activity on temperature characterized in that the optical activity is substantially invariant at temperatures below Tg of said polymer, and variant at temperatures at or near or above the Tg.

2. The optical information storage material of claim 1 where the polymeric material is a blend of two polymers and the composition of the blend is adjusted to alter the Tg.

3. The optical information storage material of claim 1 wherein the polymeric material is a UV transparent blend of two polymers.

4. The optical information storage material of claim 1 wherein the polymer material is a polyisocyanate.

5. The optical information storage material of claim 1 wherein the polymer material is a styrene-carbon monoxide copolymer.

6. The optical information storage material of claim 1, wherein the polymer material is a binapthyl labelled methacrylic acid polymer and the optical information storage is irreversible.

7. The optical information storage material of claim 1, wherein the polymer material is any polymer material with a temperature dependent optical activity.

8. A method for reversibly storing optical information is disclosed, comprising supplying a polymeric material with a dependence of optical activity on temperature characterized in that the optical activity is substantially invariant at temperatures below Tg of said polymer, and variant at a temperatures at or near the Tg, exposing said material to light wherein the absorption of light induces a temperature change in the polymer and develops in said polymer a preselected optical activity, followed by quenching below Tg wherein the preselected optical activity becomes stored.

* * * * *